(12) United States Patent
Rasile et al.

(10) Patent No.: US 6,419,074 B1
(45) Date of Patent: Jul. 16, 2002

(54) 180 DEGREE TRAY ROTATOR

(75) Inventors: John Rasile; Michael E. Caporali, both of Endicott; Richard J. Holmberg, Vestal, all of NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/500,835

(22) Filed: Feb. 10, 2000

(51) Int. Cl.[7] .............................................. B65G 47/24
(52) U.S. Cl. ...................................................... 198/399
(58) Field of Search ................................. 198/395, 399, 198/401

(56) References Cited

U.S. PATENT DOCUMENTS

| | | | | |
|---|---|---|---|---|
| 3,958,688 A | * | 5/1976 | Sterling | 198/399 X |
| 4,085,839 A | | 4/1978 | Crawford | |
| 4,369,873 A | | 1/1983 | Heuft | |
| 4,545,476 A | * | 10/1985 | Calvert | 198/399 |
| 4,696,386 A | | 9/1987 | Lem | |
| 4,706,798 A | * | 11/1987 | Hollmann | 198/399 |
| 4,784,493 A | | 11/1988 | Turcheck, Jr. | |
| 5,325,972 A | | 7/1994 | Prydtz | |
| 5,823,317 A | | 10/1998 | Bankuty | |
| 5,871,082 A | | 2/1999 | Kando | |

FOREIGN PATENT DOCUMENTS

| | | | | |
|---|---|---|---|---|
| GB | 2040852 | * | 9/1980 | 198/399 |

\* cited by examiner

*Primary Examiner*—James R. Bidwell
(74) *Attorney, Agent, or Firm*—Perkins, Smith & Cohen, LLP; Jerry Cohen; Harvey Kaye

(57) ABSTRACT

A conveying system for conveying articles, each having a label with indicia, on one end, either a leading or a trailing end. There is a conveyor having multiple sections, each defining a longitudinal conveying path for moving the articles. Each is driven independently from the other sections. The conveyor has a plurality of tray sensors, with at least one on each conveyor section for detecting whether there is a tray on that section. There is also a scanner which detects whether a tray moving along the conveyor has a label on its leading end or its trailing end. A turning arm conveyor section is located downstream from the scanner and arranged to receive control signals from the scanner for momentarily intercepting all articles which are determined by the detector to have the label on the incorrect end. This turning arm conveyor has a turning arm, and a limit stop arranged to prevent the articles moved angularly from being moved further than desired. This turning arm conveyor moves those articles angularly approximately 50 to 75 degrees to be out of their normal position along the longitudinal path of the conveyor. A stationary bump and turn element is located downstream from the turning arm conveyor for engaging those articles which are moved out of their normal position along the longitudinal path and moving them further angularly a sufficient amount that they are moved 180 degrees.

12 Claims, 2 Drawing Sheets

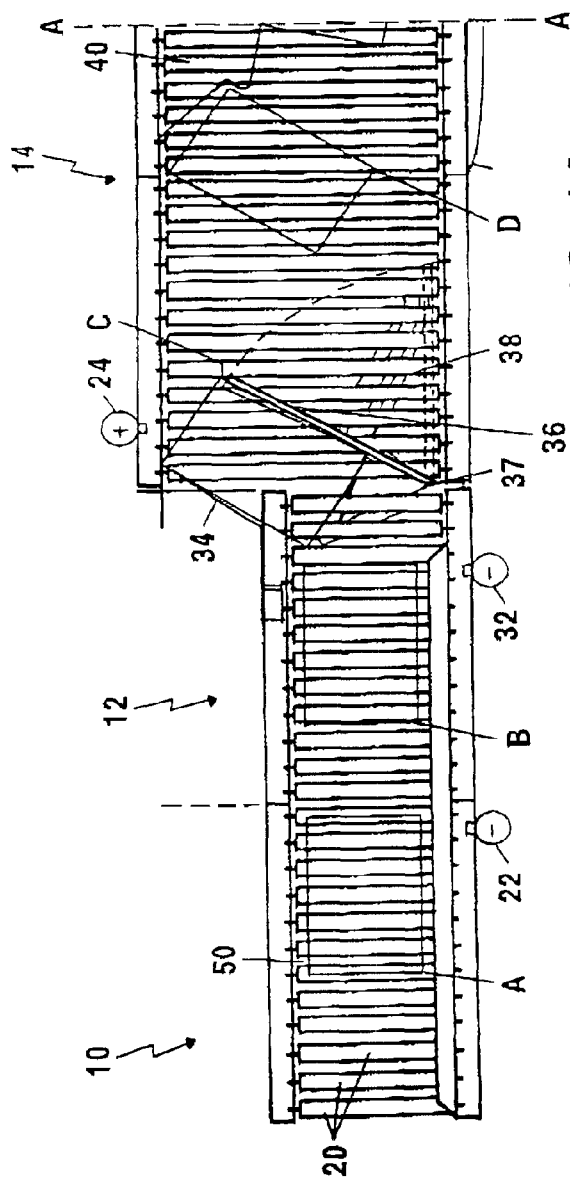
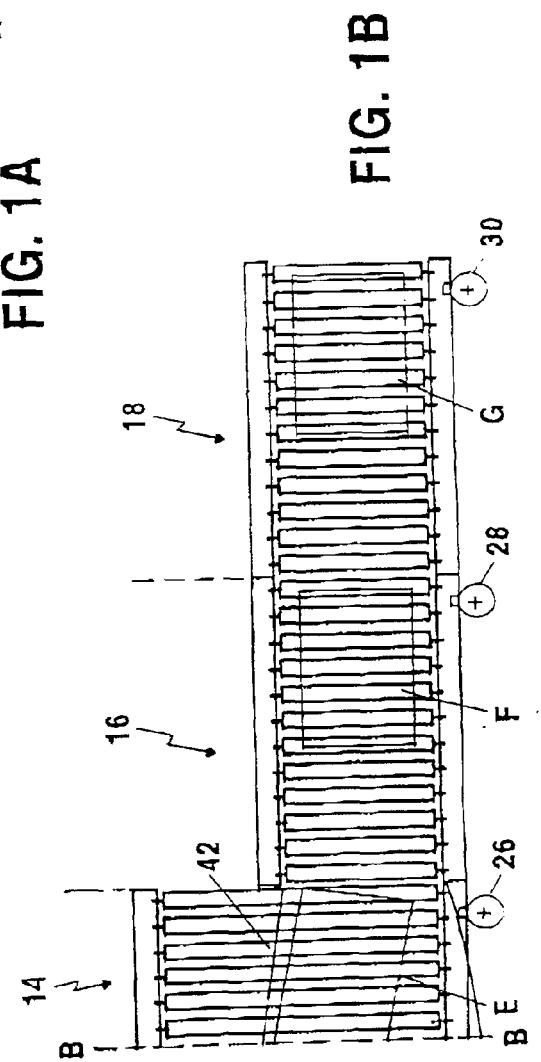

180 DEGREE TRAY ROTATOR

FIELD OF THE INVENTION

The present invention relates generally to the conveyor art, and, more particularly, to a conveyor turning station for turning articles by 180 degrees when they are not in proper position.

BACKGROUND OF THE INVENTION

In certain types of conveying systems, articles need to be turned 180 degrees, when they are not in correct position, in a very dependable and repeatable way.

U.S. Pat. No. 4,085,839 discloses apparatus for conveying and turning articles having an obstacle in the conveying path which causes every article to have its position changed by being turned 90 degrees.

U.S. Pat. No. 4,784,493 relates to element recognition and orientation, and concerns mainly optical sensors without indicating how the orientation is to take place.

U.S. Pat. No. 4,369,873 discloses apparatus for laterally deflecting articles without rotating them.

U.S. Pat. No. 4,696,386 discloses a conveyor system diverter turn assembly using a belt drive for diverting articles from one conveyor to another. The articles are moved to a new line, and are not being reoriented on the same line.

U.S. Pat. No. 5,325,972 discloses a method of controlling sorting systems, and a sorting system so controlled, and not with reorienting articles on a conveyor.

U.S. Pat. No. 5,823,317 discloses apparatus for reorienting articles while the articles are stopped from forward movement, and is a complicated mechanism.

U.S. Pat. No. 5,871,082 discloses an orientation parts feeder which acts upon all parts which enter the system and is not selective as to which articles are oriented.

SUMMARY OF THE INVENTION

It is an object of the present invention to provide a simple, inexpensive device which will turn selected articles without slowing their forward motion.

It is another object of the present invention to provide such a device which does this less expensively than prior art devices.

A further object of the present invention is to provide such a device with a robust mechanical design and robust control arrangement.

Still another object of the present invention is to provide such a device which selectively turns only those articles which are not facing a desired direction.

These and other objects are accomplished by rotation of articles, such as tubs or trays on conveyors, to be turned approximately 180 degrees, including sensors that activate a turning mechanism, that interferes with normal tray forward movement to begin to turn the tray or tub, and a second element that will continue to turn the tray approximately 180 degrees from the previous position while remaining traveling in the same direction during the turning process.

The present invention is a novel manner of rotating postal trays/tubs by 180 degrees. When a tray or tub being transported by a conveyor enters the rotator station, a pusher harm pushes the tray/tub against a strategically located stop at the same time rotating it 50–75 degrees. The pusher harm retracts and the tray is transported by driven rollers till it is intercepted by a strategically located bumper which will cause the tray/tub to rotate 105–130 degrees thus completing the 180 degree rotation.

The present invention selectively rotates mail trays (letter or flat mail) 180 degrees as required to insure label forward orientation. It utilizes data provided by a bar code reader array located upstream.

BRIEF DESCRIPTION OF THE DRAWINGS

FIGS. 1A and 1B are a composite plan view of the section of a conveyor and orienting system which selectively moves articles by rotating them by 180 degrees, and, when line A—A of FIG. 1A and line B—B of FIG. 1B are placed adjacent one another, the complete turning section is shown in plan view.

DETAILED DESCRIPTION OF THE PREFERRED EMBODIMENTS

Figure 2:
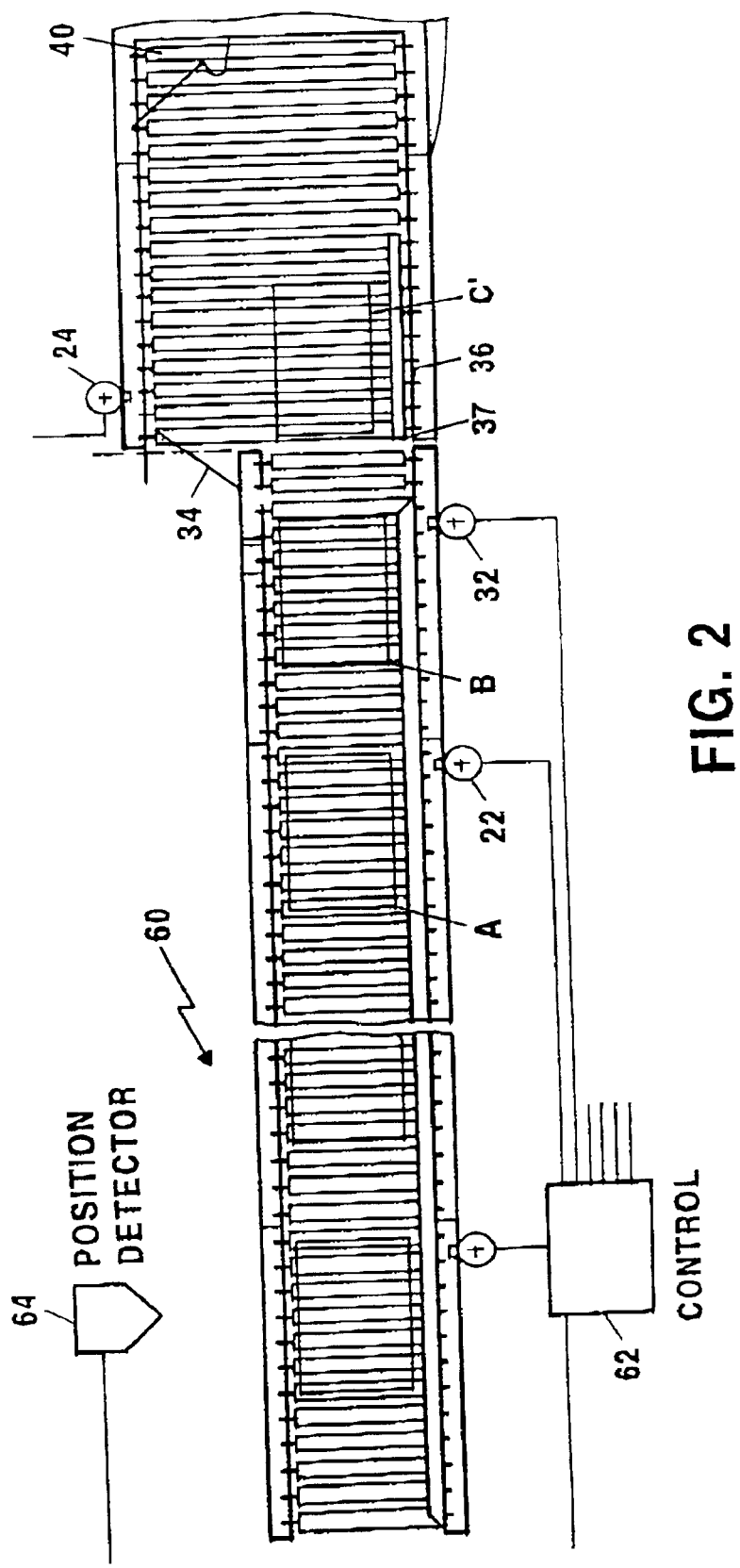
FIG. 2 is a plan view of the turning section shown in FIGS. 1 which also shows the article scanning section.

The United States Postal Service (USPS) requires that postal trays and tubs, when loaded into containers, are placed with Bar Code Labels facing out. Trays and tubs are presented to the Robotic Containerization System (RCS) with Bar Code Labels on the leading or trailing edge.

In the present invention the 180 degrees tray rotator, is designed to act selectively on objects passing through it, based on data supplied by a prior scan operation. In the design the objects can be letter mail trays, which come in two different sizes, and flat mail tubs, which represent a third distinct object type. The prior data is provided by a bar code reader array 62 shown in FIG. 2. The invention then uses the bar code reader data to orient the trays so that all bar code labels are facing forward, (leading edge).

This device could work on any similar object, and could easily be scaled to process parcels or other objects of different size. In present invention any tray which enters with the label on the leading edge is passed through without being acted on. Should a tray have the label on the trailing edge the tray rotator accomplishes a 180 degree rotation of the tray so that the label is on the leading edge when the tray exits. This rotation is accomplished without any decrease in the forward velocity of the tray and therefore no decrease in conveyor processing capability. The rotation is accomplished through the use of a pneumatically controlled pusher which, when a tray requires rotation, is deployed to affect an initial rotation of the tray of approximately 50–75 degrees. The tray then continues down the conveyor where it encounters a fixed bumper which positively contacts the adjacent corner of the tray and causes the tray to complete the 180 degree rotation. If a tray does not require rotation the pusher is not deployed, and the tray passes through unaffected.

FIGS. 1A, 1B and 2 show the present invention which reorients certain articles by rotating them by 180 degrees. It can be retrofitted into an existing conveyor line or constructed in a new conveyor line.

The present invention is shown as moving the trays from left to right as indicated by the arrows. It is shown as having been inserted into an existing line conveyor. Section 10 is the last part of the existing line before the present invention is added. The present invention includes an in-feed conveyor 12 which feeds the trays to the turning conveyor 14 in which the 180 degree turn actually takes place. As it proceeds the tray encounters the out-feed conveyor 16 and last is the existing line conveyor 18 (on the right). Thus, prior to insertion of the present invention sections 10 and 18 could have been adjacent to one another.

A tray 50 is shown in several different positions as it moves along the conveyor line and through the turning station. In position A the tray is in section or zone 10. As it moves forward it enters in-feed conveyor 12 and is shown in position B. After it enters the turning conveyor 14 it is moved (in a manner which will be explained below) into position C where it is rotated approximately 50–75 degrees from the longitudinal position it was in at position B. It moves along the conveyor in the same angular position to which it was set in position C until it reaches position D where the leading corner of the tray engages an abutment which turns the tray by 105 to 130 degrees, position E showing it just prior to completion of the turn. At this point the tray reaches the out-feed conveyor and attains position F from which it is fed to existing line conveyor 18 as shown in position G.

There are a series of sensors along the length of the conveyor for detecting the positions of the trays as they move along the conveyor. This information is used for a controlling the conveyor as explained below. In a section 60, prior to section 10, the tray in position A has been scanned and its position has been determined. This is shown in FIG. 2 and will be described in more detail below. In previous conveyor sections the trays have been aligned so that a label on it is positioned either in the leading end of the tray or the trailing end of the tray. Since it is desired that all trays be aligned with the label on the leading end, those trays which have the labels on the trailing end are to be rotated by 180 degrees, for further processing down the line.

Sensor 22 is positioned to detect tray in position A as it is about to enter the in-feed conveyor. Sensor 24 is positioned to detect tray in its aligned position prior to being turned. Thus it is in line with its prior position B. Sensor 26 detects the tray when it is in position E, sensor 28 detects the tray when it is in position F and sensor 30 detects the tray when it is in position G. An additional sensor 32 is for activating the turning arm.

The conveyor is formed by a series of parallel rolls 20 all being driven in the same direction in gangs by section or zone and driven by motors. Each section is independently driven so that each section may be independently stopped and move at different speeds. There is a control 62 (which are known in the art) for keeping track of the trays and the sections so that when the tray attains position A detector 22 informs the control 62 that the tray is in this position. As the tray moves forward another sensor detects the tray on the in-feed conveyor and informs the control. If this tray has been previously detected with the label at the rear rather than at the front, it needs to be moved 180 degrees and the control 62 informs the turning arm mechanism that it is to turn this tray when sensor 32 detects the tray. The actual movement of the turning arm 36 does not begin until sensor 24 detects the tray in its pre-turned position. However, if it has previously been determined that this tray has its label at the leading end, then no turning signal is given and the tray continues its longitudinal movement through turning conveyor 14.

When a tray which is to be turned is detected in the appropriate position for turning, the sensors activate hydraulic motor (piston/cylinder) 38 to extend and move turning arm 36 on its pivot 37 to a position approximately 50 degrees from its rest position along the side of the conveyor and thus moves the tray to position C. There is a side wall 34 to prevent the tray from moving too far as it is being moved by the turning arm 36. The turning arm returns quickly to its rest position and the tray then continues to be moved by the moving rolls 20 and continue its movement along the conveyor. A short distance after turning, the tray encounters the bump and turn assembly 40 which it engages with the leading corner of the tray. This temporarily stops the forward movement of this leading corner of the tray, but the rolls 20 keep turning and move the tray forward so that it is forced to turn by pivoting about its stopped corner. This action causes the tray to turn by approximately 130 degrees to thus complete the 180 degree turn.

Position E shows the tray as it is just completing this turn, and position F shows the tray back in its position moving in the longitudinal direction with its sides parallel to its direction of movement and with the label on the leading end so that it will be properly positioned for automatic label reading which is located downstream from this turning assembly.

Thus, only those trays which had the label at the trailing end have been turned by 180 degrees, and as they leave the turning section all trays have the labels at the leading end.

In position A the tray may be stopped waiting for downstream zones to clear. In position B the tray is in transit after downstream zones have cleared, moving through and breaking beam of turning arm sensor 32 thus activating the turning arm 36. In position C the tray has been positioned here by the turning arm, and two conditions can exist depending on the logic of the controls.

Condition 1 is that if downstream zones are filled, sensor 32 at zone 12 will detect the tray and the turning arm will remain activated holding the tray at this position until the downstream zone clears, at which point the turning arm will retract and the rollers 20 will drive the tray to position D (bump and turn).

Condition 2 is that the turning arm dwells for approximate 200 ms and then retracts and rollers 20 drive tray to position D.

In position D the tray is in transit at the bump and turn bracket at which point inertia and the drive rollers complete rotation of the tray.

In position F the tray is at the zone 16 sensor 28. At this point two conditions exist depending on logic of the controls.

Condition 1 is that zone 16 is empty in which case tray continues moving downstream.

Condition 2 is that zone 16 is filled and the tray will stop when sensor 26 senses the tray at zone 14.

Prior to induction into the RCS, appropriate trays are rotated 180 degrees so that the bar code labels are all on the leading or trailing edge of the trays or tubs. The rotator apparatus is installed between the input conveyor and the main conveyor of the RCS. The rotator includes an In-feed Zone (a 30" section of 17" wide conveyor) and a rotating zone (a 72" section of 30" wide conveyor). The rotator is not a zero pressure zone since it runs continuously and only shuts down after a given period of inactivity. Tray transport in the in-feed and rotating zones is achieved by driving the ganged rollers with 117 VAC motors. One motor dedicated to each zone. In order to achieve high throughput and reliability, the in-feed zone rolls are driven at 568 RPM and the rotating zone rollers are driven at 862 RPM compared to the input conveyor rollers which are driven at 296 RPM by power rollers.

The operation of the tray mover is thus as follows:

1. A mail tray will enter position A which is the last zero pressure zone before the rotator. The tray has already been profiled and scanned determining if it is to be rotated or not.

2. The external control, which may be a PC-104 controller will poll position F which is the first zero pressure zone after the rotator to see if it is clear. If it is clear, the tray will be sent through the rotator. If zone 16 is loaded, the tray will be held at position A until position F is clear.

3. When a tray is sent through the rotator, if it does not need to be rotated, it will be allowed to pass straight through. If the tray needs to be rotated, a photocell (turning arm activate FIG. 1) will detect the presence of the tray and will send a signal to the pneumatic cylinder to rotate the turning arm at position C. The turning arm will rotate the tray 50 to 75 degrees. A sensor on the pneumatic cylinder will provide feedback to the PC-104 controller indicating that rotation occurred. The turning arm will retract and the tray will move to position D where it will be intercepted by the bump-and-turn bracket 40 and will rotate 105 to 130 degrees thus completing the 180 degree rotation. The tray then moves to position F and either stops or proceeds on depending on the availability of the following zone.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A 180 degree article mover for a conveying system which includes a conveyor for moving articles along a longitudinal conveying path, comprising:
   a. a longitudinal conveying path, said path having a plurality of sections, each having its own drive mechanism;
   b. a detector for detecting whether an article moving along the longitudinal conveying path is in the correct orientation;
   b. an interceptor downstream from the detector and arranged to receive control signals from the detector for momentarily intercepting all articles which are determined by the detector to be in an incorrect orientation and moving the articles which are in an incorrect orientation angularly to be out of their normal position along the longitudinal path;
   d. a secondary turning element downstream from said interceptor for engaging those articles which are moved out of their normal position along the longitudinal path for moving them further angularly a sufficient amount that they are moved 180 degrees in total with respect to their position when detected by the detector; and
   e. a plurality of sensors in the plurality of sections for controlling the movement of articles;
   said path, detector, interceptor and turning element being constructed and arranged so that the article continues moving along the path even when it is being reoriented.

2. An article mover as defined in claim 1 wherein said interceptor is an arm which is moved into the longitudinal path to divert the tray out of its normal position.

3. An article mover as defined in claim 2 further comprising an actuator for receiving signals from said detector significant of an incorrectly oriented tray for moving said arm to divert such a tray.

4. An article mover as defined in claim 1 further comprising a control for receiving information from said detector and said sensors and controlling movement of articles in each section and the interceptor.

5. An article mover as defined in claim 1 wherein there is a limit stop arranged to prevent the trays moved angularly from being moved further than desired by the turning element.

6. An article mover as defined in claim 4 wherein said secondary turning element is a projection which extends into the path of articles moved out of their normal position.

7. In a 180 degree tray mover for a conveying system which includes a conveyor with multiple sections for moving articles along a longitudinal conveying path, each section defining a longitudinal conveying path for moving mail trays and each being driven independently from the other sections, and a plurality of tray sensors, at least one for each conveyor section for detecting whether there is a tray on such section, the improvement comprising:
   b. a mail tray scanner for detecting whether a tray moving along the conveyor has a bar code label on its leading end or its trailing end;
   c. a turning arm conveyor section downstream from the scanner and arranged to receive control signals from the scanner for momentarily intercepting all articles which are determined by the detector to have the bar code label on the incorrect end and moving those mail trays angularly approximately 50 to 75 degrees to be out of their normal position along the longitudinal path; and
   d. a secondary turning element downstream from said turning conveyor for engaging those trays which are moved out of their normal position along the longitudinal path for moving them further angularly a sufficient amount that they are moved 180 degrees in total with respect to their position when detected by the detector.

8. The improvement as defined in claim 7, wherein said secondary turning element is a stationary bump and turn element disposed in the path of those trays which are moved out of their normal position.

9. The improvement as defined in claim 8, further comprising control means for receiving information signals from said sensors and said scanner and for controlling movement of said turning arm conveyor and said conveyor sections so that there is only one tray in each conveyor section at any time, and arranged to maintain all the conveyor sections moving trays along said path except when the path immediately downstream already has a tray on it.

10. A conveying system for conveying mail trays, each having a bar code label on an end thereof, comprising:
   a. a conveyor having multiple sections, each defining a longitudinal conveying path for moving mail trays, and each being driven independently from the other sections;
   b. a plurality of tray sensors, at least one on each conveyor section for detecting whether there is a tray on such section;
   c. a mail tray scanner for detecting whether a tray moving along the conveyor has a bar code label on its leading end or its trailing end;
   d. a turning arm conveyor section downstream from the scanner and arranged to receive control signals from the scanner for momentarily intercepting all articles which are determined by the detector to have the bar code label on the incorrect end and moving those mail trays angularly approximately 50 to 75 degrees to be out of their normal position along the longitudinal path;

e. a stationary bump and turn element downstream from said turning arm for engaging those articles which are moved out of their normal position along the longitudinal path and moving them further angularly a sufficient amount that they are moved 180 degrees in total with respect to their position when detected by the scanner; and f. control means for receiving information signals from said sensors and said scanner and for controlling movement of said turning arm conveyor and said conveyor sections so that there is only one tray in each conveyor section at any time, and arranged to maintain all the conveyor sections moving trays along said path except when the path immediately downstream already has a tray on it.

11. A conveying system as defined in claim 10 wherein said turning arm section has a turning arm for actually moving trays angularly when required, and a limit stop arranged to prevent the trays moved angularly from being moved further than desired.

12. A 180 degree article mover for a conveying system which includes a conveyor for moving articles along a longitudinal conveying path, comprising:

a. a longitudinal conveying path, said path having a plurality of sections, each having its own drive mechanism;

b. a detector for detecting whether an article moving along the longitudinal conveying path is in the correct orientation;

b. an interceptor downstream from the detector and arranged to receive control signals from the detector for momentarily intercepting all articles which are determined by the detector to be in an incorrect orientation and moving the articles which are in an incorrect orientation angularly to be out of their normal position along the longitudinal path;

d. a secondary turning element downstream from said interceptor for engaging those articles which are moved out of their normal position along the longitudinal path for moving them further angularly a sufficient amount that they are moved 180 degrees in total with respect to their position when detected by the detector; and e. a plurality of sensors in the plurality of sections for controlling the movement of articles.

* * * * *